(12) United States Patent
Raichelgauz et al.

(10) Patent No.: US 11,758,004 B2
(45) Date of Patent: Sep. 12, 2023

(54) SYSTEM AND METHOD FOR PROVIDING RECOMMENDATIONS BASED ON USER PROFILES

(71) Applicant: Cortica Ltd., Tel Aviv (IL)

(72) Inventors: Igal Raichelgauz, Tel Aviv (IL);
Karina Odinaev, Tel Aviv (IL);
Yehoshua Y. Zeevi, Haifa (IL)

(73) Assignee: Cortica Ltd., Tel Aviv (IL)

( * ) Notice: Subject to any disclaimer, the term of this patent is extended or adjusted under 35 U.S.C. 154(b) by 929 days.

(21) Appl. No.: 16/726,933

(22) Filed: Dec. 26, 2019

(65) Prior Publication Data

US 2020/0213415 A1 Jul. 2, 2020

Related U.S. Application Data

(63) Continuation of application No. 15/206,726, filed on Jul. 11, 2016, now abandoned.
(Continued)

(51) Int. Cl.
*G06F 16/00* (2019.01)
*H04L 67/306* (2022.01)
(Continued)

(52) U.S. Cl.
CPC ........ *H04L 67/306* (2013.01); *G06F 16/9535* (2019.01); *H04H 60/46* (2013.01);
(Continued)

(58) Field of Classification Search
CPC . H04L 67/306; H04L 67/535; G06F 16/9535; H04H 60/46; H04H 2201/90;
(Continued)

(56) References Cited

U.S. PATENT DOCUMENTS

| 4,733,353 A | 3/1988 | Jaswa |
| 4,932,645 A | 6/1990 | Schorey et al. |

(Continued)

FOREIGN PATENT DOCUMENTS

| WO | 0231764 A2 | 4/2002 |
| WO | 2003067467 A1 | 8/2003 |

(Continued)

OTHER PUBLICATIONS

Jasinschi et al., A Probabilistic Layered Framework for Integrating Multimedia Content and Context Information, 2002, IEEE, p. 2057-2060. (Year: 2002).

(Continued)

*Primary Examiner* — Noosha Arjomandi
(74) *Attorney, Agent, or Firm* — Reches Patents

(57) ABSTRACT

A system and method for providing recommendations based on current user interests. The method includes identifying at least one current variable, wherein each current variable is associated with a user device or a user; determining, based on the identified at least one current variable, at least one current user interest of a user profile, the user profile including at least one contextual insight, wherein each contextual insight is based on at least one signature for at least one multimedia content element associated with the user; searching for at least one multimedia content element that matches the at least one current user interest; and causing a display of the at least one matching content item as a recommendation.

21 Claims, 8 Drawing Sheets

Related U.S. Application Data

(60) Provisional application No. 62/292,388, filed on Feb. 8, 2016.

(51) Int. Cl.
| | |
|---|---|
| *H04H 60/46* | (2008.01) |
| *H04N 21/2668* | (2011.01) |
| *H04N 7/173* | (2011.01) |
| *H04N 21/258* | (2011.01) |
| *H04N 21/81* | (2011.01) |
| *G06F 16/9535* | (2019.01) |
| *H04N 21/466* | (2011.01) |

(52) U.S. Cl.
CPC ... *H04N 7/17318* (2013.01); *H04N 21/25891* (2013.01); *H04N 21/2668* (2013.01); *H04N 21/466* (2013.01); *H04N 21/8106* (2013.01); *H04H 2201/90* (2013.01)

(58) Field of Classification Search
CPC ......... H04N 7/17318; H04N 21/25891; H04N 21/2668; H04N 21/466; H04N 21/8106; H04N 21/251
See application file for complete search history.

(56) References Cited

U.S. PATENT DOCUMENTS

| | | | |
|---|---|---|---|
| 4,972,363 | A | 11/1990 | Nguyen et al. |
| 5,214,746 | A | 5/1993 | Fogel et al. |
| 5,638,425 | A | 6/1997 | Meador et al. |
| 5,745,678 | A | 4/1998 | Herzberg et al. |
| 5,763,069 | A | 6/1998 | Jordan |
| 5,991,306 | A | 11/1999 | Burns et al. |
| 6,070,167 | A | 5/2000 | Qian et al. |
| 6,122,628 | A | 9/2000 | Castelli et al. |
| 6,243,375 | B1 | 6/2001 | Speicher |
| 6,275,599 | B1 | 8/2001 | Adler et al. |
| 6,329,986 | B1 | 12/2001 | Cheng |
| 6,507,672 | B1 | 1/2003 | Watkins et al. |
| 6,524,861 | B1 | 2/2003 | Anderson |
| 6,550,018 | B1 | 4/2003 | Abonamah et al. |
| 6,557,042 | B1 | 4/2003 | He et al. |
| 6,601,026 | B2 | 7/2003 | Appelt et al. |
| 6,611,628 | B1 | 8/2003 | Sekiguchi et al. |
| 6,618,711 | B1 | 9/2003 | Ananth |
| 6,640,015 | B1 | 10/2003 | Lafruit |
| 6,665,657 | B1 | 12/2003 | Dibachi |
| 6,751,613 | B1 | 6/2004 | Lee et al. |
| 6,754,435 | B2 | 6/2004 | Kim |
| 6,763,069 | B1 | 7/2004 | Divakaran et al. |
| 6,813,395 | B1 | 11/2004 | Kinjo |
| 6,819,797 | B1 | 11/2004 | Smith et al. |
| 6,901,207 | B1 | 5/2005 | Watkins |
| 6,985,172 | B1 | 1/2006 | Rigney et al. |
| 7,013,051 | B2 | 3/2006 | Sekiguchi et al. |
| 7,020,654 | B1 | 3/2006 | Najmi |
| 7,158,681 | B2 | 1/2007 | Persiantsev |
| 7,215,828 | B2 | 5/2007 | Luo |
| 7,260,564 | B1 | 8/2007 | Lynn et al. |
| 7,299,261 | B1 | 11/2007 | Dliver et al. |
| 7,302,117 | B2 | 11/2007 | Sekiguchi et al. |
| 7,313,805 | B1 | 12/2007 | Rosin et al. |
| 7,340,358 | B2 | 3/2008 | Yoneyama |
| 7,353,224 | B2 | 4/2008 | Chen et al. |
| 7,376,672 | B2 | 5/2008 | Weare |
| 7,433,895 | B2 | 10/2008 | Li et al. |
| 7,464,086 | B2 | 12/2008 | Black et al. |
| 7,529,659 | B2 | 5/2009 | Wold |
| 7,657,100 | B2 | 2/2010 | Gokturk et al. |
| 7,660,468 | B2 | 2/2010 | Gokturk et al. |
| 7,801,893 | B2 | 9/2010 | Gulli et al. |
| 7,860,895 | B1 | 12/2010 | Scofield |
| 7,933,407 | B2 | 4/2011 | Keidar et al. |
| 8,098,934 | B2 | 1/2012 | Vincent |
| 8,266,185 | B2 | 9/2012 | Raichelgauz et al. |
| 8,275,764 | B2 | 9/2012 | Jeon |
| 8,312,031 | B2 | 11/2012 | Raichelgauz et al. |
| 8,315,442 | B2 | 11/2012 | Gokturk et al. |
| 8,345,982 | B2 | 1/2013 | Gokturk et al. |
| RE44,225 | E | 5/2013 | Aviv |
| 8,457,827 | B1 | 6/2013 | Ferguson et al. |
| 8,495,489 | B1 | 7/2013 | Everingham |
| 8,527,978 | B1 | 9/2013 | Sallam |
| 8,634,980 | B1 | 1/2014 | Urmson |
| 8,655,801 | B2 | 2/2014 | Raichelgauz et al. |
| 8,655,878 | B1 | 2/2014 | Kulkarni et al. |
| 8,781,152 | B2 | 7/2014 | Momeyer |
| 8,782,077 | B1 | 7/2014 | Rowley |
| 8,799,195 | B2 | 8/2014 | Raichelgauz et al. |
| 8,799,196 | B2 | 8/2014 | Raichelquaz et al. |
| 8,818,916 | B2 | 8/2014 | Raichelgauz et al. |
| 8,868,861 | B2 | 10/2014 | Shimizu et al. |
| 8,886,648 | B1 | 11/2014 | Procopio et al. |
| 9,124,932 | B2 * | 9/2015 | Schein .................. H04N 5/782 |
| 9,165,406 | B1 | 10/2015 | Gray et al. |
| 9,298,763 | B1 | 3/2016 | Zack |
| 9,323,754 | B2 | 4/2016 | Ramanathan et al. |
| 9,440,647 | B1 | 9/2016 | Sucan |
| 9,466,068 | B2 | 10/2016 | Raichelgauz et al. |
| 9,646,006 | B2 | 5/2017 | Raichelgauz et al. |
| 9,679,062 | B2 | 6/2017 | Schillings et al. |
| 9,734,533 | B1 | 8/2017 | Givot |
| 9,807,442 | B2 | 10/2017 | Bhatia et al. |
| 9,984,369 | B2 | 5/2018 | Li et al. |
| 10,133,947 | B2 | 11/2018 | Yang |
| 10,347,122 | B2 | 7/2019 | Takenaka |
| 10,491,885 | B1 | 11/2019 | Hicks |
| 10,848,590 | B2 * | 11/2020 | Raichelgauz ......... H04L 67/306 |
| 2001/0019633 | A1 | 9/2001 | Tenze |
| 2001/0038876 | A1 | 11/2001 | Anderson |
| 2002/0010682 | A1 | 1/2002 | Johnson |
| 2002/0010715 | A1 | 1/2002 | Chinn et al. |
| 2002/0019882 | A1 | 2/2002 | Bokhani |
| 2002/0032677 | A1 | 3/2002 | Morgenthaler et al. |
| 2002/0037010 | A1 | 3/2002 | Yamauchi |
| 2002/0038299 | A1 | 3/2002 | Zernik et al. |
| 2002/0072935 | A1 | 6/2002 | Rowse et al. |
| 2002/0087530 | A1 | 7/2002 | Smith et al. |
| 2002/0107827 | A1 | 8/2002 | Benitez-Jimenez et al. |
| 2002/0129140 | A1 | 9/2002 | Peled et al. |
| 2002/0147637 | A1 | 10/2002 | Kraft et al. |
| 2002/0163532 | A1 | 11/2002 | Thomas |
| 2002/0174095 | A1 | 11/2002 | Lulich et al. |
| 2003/0037010 | A1 | 2/2003 | Schmelzer |
| 2003/0089216 | A1 | 5/2003 | Birmingham et al. |
| 2003/0101150 | A1 | 5/2003 | Agnihotri |
| 2003/0105739 | A1 | 6/2003 | Essafi et al. |
| 2003/0200217 | A1 | 10/2003 | Ackerman |
| 2003/0217335 | A1 | 11/2003 | Chung et al. |
| 2003/0229531 | A1 | 12/2003 | Heckerman et al. |
| 2004/0059736 | A1 | 3/2004 | Willse |
| 2004/0091111 | A1 | 5/2004 | Levy |
| 2004/0117638 | A1 | 6/2004 | Vlonroe |
| 2004/0153426 | A1 | 8/2004 | Nugent |
| 2004/0230572 | A1 | 11/2004 | Omoigui |
| 2004/0267774 | A1 | 12/2004 | Lin et al. |
| 2005/0021394 | A1 | 1/2005 | Miedema et al. |
| 2005/0114198 | A1 | 5/2005 | Koningstein et al. |
| 2005/0131884 | A1 | 6/2005 | Gross et al. |
| 2005/0172130 | A1 | 8/2005 | Roberts |
| 2005/0177372 | A1 | 8/2005 | Wang et al. |
| 2005/0193015 | A1 | 9/2005 | Logston |
| 2005/0238198 | A1 | 10/2005 | Brown et al. |
| 2005/0249398 | A1 | 11/2005 | Khamene et al. |
| 2005/0256820 | A1 | 11/2005 | Dugan et al. |
| 2005/0262428 | A1 | 11/2005 | Little et al. |
| 2005/0289163 | A1 | 12/2005 | Gordon et al. |
| 2005/0289590 | A1 | 12/2005 | Cheok et al. |
| 2006/0033163 | A1 | 2/2006 | Chen |
| 2006/0085818 | A1 * | 4/2006 | Bodlaender ............ H04N 7/16 725/35 |
| 2006/0100987 | A1 | 5/2006 | Leurs |

(56) References Cited

U.S. PATENT DOCUMENTS

| | | |
|---|---|---|
| 2006/0120626 A1 | 6/2006 | Perlmutter |
| 2006/0217828 A1 | 9/2006 | Hicken |
| 2006/0236343 A1 | 10/2006 | Chang |
| 2006/0242130 A1 | 10/2006 | Sadri |
| 2006/0248558 A1 | 11/2006 | Barton |
| 2006/0251339 A1 | 11/2006 | Gokturk |
| 2006/0253423 A1 | 11/2006 | McLane et al. |
| 2006/0288002 A1 | 12/2006 | Epstein et al. |
| 2007/0022374 A1 | 1/2007 | Huang et al. |
| 2007/0038614 A1 | 2/2007 | Guha |
| 2007/0061302 A1 | 3/2007 | Ramer et al. |
| 2007/0074147 A1 | 3/2007 | Wold |
| 2007/0083611 A1 | 4/2007 | Farago et al. |
| 2007/0130159 A1 | 6/2007 | Gulli et al. |
| 2007/0156720 A1 | 7/2007 | Maren |
| 2007/0196013 A1 | 8/2007 | Li |
| 2007/0244902 A1 | 10/2007 | Seide et al. |
| 2007/0253594 A1 | 11/2007 | Lu et al. |
| 2007/0298152 A1 | 12/2007 | Baets |
| 2008/0072256 A1 | 3/2008 | Boicey et al. |
| 2008/0109433 A1 | 5/2008 | Rose |
| 2008/0152231 A1 | 6/2008 | Gokturk et al. |
| 2008/0165861 A1 | 7/2008 | Wen |
| 2008/0166020 A1 | 7/2008 | Kosaka |
| 2008/0201299 A1 | 8/2008 | Lehikoinen et al. |
| 2008/0201314 A1 | 8/2008 | Smith et al. |
| 2008/0228995 A1 | 9/2008 | Tan et al. |
| 2008/0237359 A1 | 10/2008 | Silverbrook et al. |
| 2008/0253737 A1 | 10/2008 | Kimura |
| 2008/0263579 A1 | 10/2008 | Mears et al. |
| 2008/0270373 A1 | 10/2008 | Oostveen et al. |
| 2008/0270569 A1 | 10/2008 | McBride |
| 2008/0294278 A1 | 11/2008 | Borgeson |
| 2008/0307454 A1 | 12/2008 | Ahanger et al. |
| 2008/0313140 A1 | 12/2008 | Pereira et al. |
| 2009/0022472 A1 | 1/2009 | Bronstein |
| 2009/0024641 A1 | 1/2009 | Quigley et al. |
| 2009/0034791 A1 | 2/2009 | Doretto |
| 2009/0043637 A1 | 2/2009 | Eder |
| 2009/0043818 A1 | 2/2009 | Raichelgauz |
| 2009/0080759 A1 | 3/2009 | Bhaskar |
| 2009/0125544 A1 | 5/2009 | Brindley |
| 2009/0172030 A1 | 7/2009 | Schiff et al. |
| 2009/0216761 A1 | 8/2009 | Raichelgauz et al. |
| 2009/0220138 A1 | 9/2009 | Zhang et al. |
| 2009/0245573 A1 | 10/2009 | Saptharishi et al. |
| 2009/0254572 A1 | 10/2009 | Redlich et al. |
| 2009/0278934 A1 | 11/2009 | Ecker |
| 2009/0282218 A1 | 11/2009 | Raichelgauz et al. |
| 2010/0042646 A1 | 2/2010 | Raichelgauz et al. |
| 2010/0082684 A1* | 4/2010 | Churchill ............ G06F 16/9535 |
| | | 707/784 |
| 2010/0104184 A1 | 4/2010 | Bronstein |
| 2010/0111408 A1 | 5/2010 | Matsuhira |
| 2010/0125569 A1 | 5/2010 | Nair |
| 2010/0162405 A1 | 6/2010 | Cook |
| 2010/0198626 A1 | 8/2010 | Cho et al. |
| 2010/0306193 A1 | 12/2010 | Pereira |
| 2010/0318493 A1 | 12/2010 | Wessling |
| 2010/0325138 A1 | 12/2010 | Lee et al. |
| 2010/0325581 A1 | 12/2010 | Finkelstein et al. |
| 2011/0029620 A1 | 2/2011 | Bonforte |
| 2011/0038545 A1 | 2/2011 | Bober |
| 2011/0055585 A1 | 3/2011 | Lee |
| 2011/0164180 A1 | 7/2011 | Lee |
| 2011/0164810 A1 | 7/2011 | Zang et al. |
| 2011/0166932 A1* | 7/2011 | Smith .................. H04N 21/812 |
| | | 715/835 |
| 2011/0209170 A1* | 8/2011 | Schein ............... H04N 21/4828 |
| | | 725/14 |
| 2011/0246566 A1 | 10/2011 | Kashef |
| 2011/0276680 A1 | 11/2011 | Rimon |
| 2011/0296315 A1 | 12/2011 | Lin et al. |
| 2012/0133497 A1 | 5/2012 | Sasaki |
| 2012/0167133 A1 | 6/2012 | Carroll |
| 2012/0179642 A1 | 7/2012 | Sweeney et al. |
| 2012/0179751 A1 | 7/2012 | Ahn |
| 2012/0185445 A1 | 7/2012 | Borden et al. |
| 2012/0197857 A1 | 8/2012 | Huang |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0299961 A1 | 11/2012 | Ramkumar et al. |
| 2012/0301105 A1 | 11/2012 | Rehg et al. |
| 2012/0331011 A1 | 12/2012 | Raichelgauz et al. |
| 2013/0066856 A1 | 3/2013 | Ong et al. |
| 2013/0067364 A1 | 3/2013 | Berntson et al. |
| 2013/0089248 A1 | 4/2013 | Remiszewski |
| 2013/0103814 A1 | 4/2013 | Carrasco |
| 2013/0159298 A1 | 6/2013 | Mason et al. |
| 2013/0212493 A1 | 8/2013 | Krishnamurthy |
| 2013/0226820 A1 | 8/2013 | Sedota, Jr. |
| 2013/0226930 A1 | 8/2013 | Arngren et al. |
| 2013/0283401 A1 | 10/2013 | Pabla et al. |
| 2014/0025692 A1 | 1/2014 | Pappas |
| 2014/0059443 A1 | 2/2014 | Tabe |
| 2014/0095425 A1 | 4/2014 | Sipple |
| 2014/0111647 A1 | 4/2014 | Atsmon |
| 2014/0125703 A1 | 5/2014 | Roveta |
| 2014/0147829 A1 | 5/2014 | Jerauld |
| 2014/0152698 A1 | 6/2014 | Kim et al. |
| 2014/0169681 A1 | 6/2014 | Drake |
| 2014/0176604 A1 | 6/2014 | Venkitaraman et al. |
| 2014/0193077 A1 | 7/2014 | Shiiyama et al. |
| 2014/0201330 A1 | 7/2014 | Lozano Lopez |
| 2014/0250032 A1 | 9/2014 | Huang et al. |
| 2014/0258219 A1* | 9/2014 | Raichelgauz ......... G06F 16/685 |
| | | 707/737 |
| 2014/0282655 A1 | 9/2014 | Roberts |
| 2014/0300722 A1 | 10/2014 | Garcia |
| 2014/0330830 A1 | 11/2014 | Raichelgauz et al. |
| 2014/0341476 A1 | 11/2014 | Kulick et al. |
| 2014/0379477 A1 | 12/2014 | Sheinfeld |
| 2015/0033150 A1 | 1/2015 | Lee |
| 2015/0100562 A1 | 4/2015 | Kohlmeier et al. |
| 2015/0117784 A1 | 4/2015 | Lin |
| 2015/0134688 A1 | 5/2015 | Jing |
| 2015/0254344 A1 | 9/2015 | Kulkarni et al. |
| 2015/0286742 A1 | 10/2015 | Zhang et al. |
| 2015/0324356 A1 | 11/2015 | Gutierrez et al. |
| 2015/0363644 A1 | 12/2015 | Wnuk |
| 2016/0007083 A1 | 1/2016 | Gurha |
| 2016/0026707 A1 | 1/2016 | Ong et al. |
| 2016/0210525 A1 | 7/2016 | Yang |
| 2016/0221592 A1 | 8/2016 | Puttagunta |
| 2016/0306798 A1 | 10/2016 | Guo |
| 2016/0342593 A1* | 11/2016 | Raichelgauz ......... H04N 21/466 |
| 2016/0342683 A1 | 11/2016 | Kwon |
| 2016/0357188 A1 | 12/2016 | Ansari |
| 2017/0017638 A1 | 1/2017 | Satyavarta et al. |
| 2017/0032257 A1 | 2/2017 | Sharifi |
| 2017/0041254 A1 | 2/2017 | Agara Venkatesha Rao |
| 2017/0109602 A1 | 4/2017 | Kim |
| 2017/0154241 A1 | 6/2017 | Shambik et al. |
| 2017/0185690 A1* | 6/2017 | Raichelgauz ......... H04L 67/306 |
| 2017/0255620 A1 | 9/2017 | Raichelgauz |
| 2017/0262437 A1 | 9/2017 | Raichelgauz |
| 2017/0323568 A1 | 11/2017 | Inoue |
| 2018/0081368 A1 | 3/2018 | Watanabe |
| 2018/0101177 A1 | 4/2018 | Cohen |
| 2018/0157916 A1 | 6/2018 | Doumbouya |
| 2018/0158323 A1 | 6/2018 | Takenaka |
| 2018/0204111 A1 | 7/2018 | Zadeh |
| 2019/0005726 A1 | 1/2019 | Nakano |
| 2019/0039627 A1 | 2/2019 | Yamamoto |
| 2019/0043274 A1 | 2/2019 | Hayakawa |
| 2019/0045244 A1 | 2/2019 | Balakrishnan |
| 2019/0056718 A1 | 2/2019 | Satou |
| 2019/0065951 A1 | 2/2019 | Luo |
| 2019/0188501 A1 | 6/2019 | Ryu |
| 2019/0220011 A1 | 7/2019 | Della Penna |
| 2019/0317513 A1 | 10/2019 | Zhang |
| 2019/0364492 A1 | 11/2019 | Azizi |
| 2019/0384303 A1 | 12/2019 | Muller |

(56) References Cited

U.S. PATENT DOCUMENTS

| | | |
|---|---|---|
| 2019/0384312 A1 | 12/2019 | Herbach |
| 2019/0385460 A1 | 12/2019 | Magzimof |
| 2019/0389459 A1 | 12/2019 | Berntorp |
| 2020/0004248 A1 | 1/2020 | Healey |
| 2020/0004251 A1 | 1/2020 | Zhu |
| 2020/0004265 A1 | 1/2020 | Zhu |
| 2020/0005631 A1 | 1/2020 | Visintainer |
| 2020/0018606 A1 | 1/2020 | Wolcott |
| 2020/0018618 A1 | 1/2020 | Ozog |
| 2020/0020212 A1 | 1/2020 | Song |
| 2020/0050973 A1 | 2/2020 | Stenneth |
| 2020/0073977 A1 | 3/2020 | Montemerlo |
| 2020/0090484 A1 | 3/2020 | Chen |
| 2020/0097756 A1 | 3/2020 | Hashimoto |
| 2020/0133307 A1 | 4/2020 | Kelkar |
| 2020/0043326 A1 | 6/2020 | Tao |
| 2020/0213415 A1* | 7/2020 | Raichelgauz ...... H04N 21/8106 |

FOREIGN PATENT DOCUMENTS

| | | |
|---|---|---|
| WO | 2005027457 A1 | 3/2005 |
| WO | 2007049282 A2 | 5/2007 |
| WO | 2014076002 A1 | 5/2014 |
| WO | 2014137337 A1 | 9/2014 |
| WO | 2016040376 A1 | 3/2016 |
| WO | 2016070193 A1 | 5/2016 |

OTHER PUBLICATIONS

Jones et al., "Contextual Dynamics of Group-Based Sharing Decisions", 2011, University of Bath, p. 1777-1786. (Year: 2011).
Iwamoto, "Image Signature Robust to Caption Superimpostion for Video Sequence Identification", IEEE, pp. 3185-3188 (Year: 2006).
Cooperative Multi-Scale Convolutional Neural, Networks for Person Detection, Markus Eisenbach, Daniel Seichter, Tim Wengefeld, and Horst-Michael Gross Ilmenau University of Technology, Neuroinformatics and Cognitive Robotics Lab (Year; 2016).
Chen, Yixin, James Ze Wang, and Robert Krovetz. "CLUE: cluster-based retrieval of images by unsupervised learning." IEEE transactions on Image Processing 14.8 (2005); 1187-1201. (Year: 2005).
Wusk et al (Non-Invasive detection of Respiration and Heart Rate with a Vehicle Seat Sensor; www.mdpi.com/journal/sensors; Published: May 8, 2018). (Year: 2018).
Chen, Tiffany Yu-Han, et al. "Glimpse: Continuous, real-time object recognition on mobile devices." Proceedings of the 13th ACM Confrecene on Embedded Networked Sensor Systems. 2015. (Year: 2015).
Ma et el. ("Semantics modeling based image retrieval system using neural networks" 2005 (Year: 2005).
Vallet et al ("Personalized Content Retrieval in Context Using Ontological Knowledge" Mar. 2007) (Year: 2007).
Li et al ("Matching Commercial Clips from TV Streams Using a Unigue, Robust and Compact Signature" 2005) (Year: 2005).
Stolberq et al ("HIBRID-SOC: A Multi-Core SOC Architecture for Multimedia Signal Processing" 2003) (Year: 2003).
Big Bang Theory Series 04 Episode 12, aired Jan. 6, 2011; [retrieved from Internet: ].
Boari et al, "Adaptive Routing for Dynamic Applications in Massively Parallel Architectures", 1995 IEEE, Spring 1995.
Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.
Bernansky et al, "Feed-forward Echo State Networks", Proceedings of International Joint Conference on Neural Networks, Montreal, Canada, Jul. 31-Aug. 4, 2005, pp. 1-4.
Falhy et al, "A Parallel Design and Implementation for Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.
Freisleben et al, "Recognition of Fractal Images Using a Neural Network", Lecture Notes in Computer Science, 1993, vol. 6861, 1993, pp. 631-637.
Garcia, "Solving the Weighted Region Least Cost Path Problem Using Transputers", Naval Postgraduate School, Monterey, California, Dec. 1989.
Hogue, "Tree Pattern Inference and Matching for Wrapper Induction on the World Wide Web", Master's Thesis, Massachusetts Institute of Technology, Jun. 2004, pp. 1-106.
Hogue, "Tree Pattern Inference and Matching for Wrapper Induction on the World Wide Web", Master's Thesis, Massachusetts institute of Technology, 2004, pp. 1-106.
Howlett et al, "A Multi-Computer Neural Network Architecture in a Virtual Sensor System Application", International journal of knowledge-based intelligent engineering systems, 4 (2). pp. 86-93, 133N 1327-2314.
Hua et al., "Robust Video Signature Based on Ordinal Measure", Image Processing, 2004, 2004 International Conference on Image Processing (ICIP), vol. 1, IEEE, pp. 685-688, 2004.
International Search Report and Written Opinion for PCT/US2016/050471, ISA/RU, Moscow, RU, dated May 4, 2017.
International Search Report and Written Opinion for PCT/US2016/054634, ISA/RU, Moscow, RU, dated Mar. 16, 2017.
International Search Report and Written Opinion for PCT/US2017/015831, ISA/RU, Moscow, RU, dated Apr. 20, 2017.
Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.
Lau et al., "Semantic Web Service Adaptation Model for a Pervasive Learning Scenario", 2008 IEEE Conference on Innovative Technologies in Intelligent Systems and Industrial Applications, 2008, pp. 98-103.
Lin et al., "Generating robust digital signature for image/video authentication", Multimedia and Security Workshop at ACM Multimedia '98, Bristol, UK, Sep. 1998, pp. 245-251.
Lu et al, "Structural Digital Signature for Image Authentication: An Incidental Distortion Resistant Scheme", IEEE Transactions on Multimedia, vol. 5, No. 2, Jun. 2003, pp. 161-173.
Lyon, "Computational Models of Neural Auditory Processing", IEEE International Conference on Acoustics, Speech, and Signal Processing, ICASSP '84, Date of Conference: Mar. 1984, vol. 9, pp. 41-44.
May et al, "The Transputer", Springer-Verlag Berlin Heidelberg 1989, vol. 41.
McNamara et al., "Diversity Decay in opportunistic Content Sharing Systems", 2011 IEEE International Symposium on a World of Wireless, Mobile and Multimedia Networks, pp. 1-3.
Morad et al., "Performance, Power Efficiency and Scalability of Asymmetric Cluster Chip Multiprocessors", Computer Architecture Letters, vol. 4, Jul. 4, 2005, pp. 1-4, XP002466254.
Nagy et al, "A Transputer, Based, Flexible, Real-Time Control System for Robotic Manipulators", UKACC International Conference on CONTROL '96, Sep. 2-5, 1996, Conference Publication No. 427, IEE 1996.
Natschlager et al., "The "Liquid Computer": A novel strategy for real-time computing on time series", Special Issue on Foundations of Information Processing of telematik, vol. 8, No. 1, 2002, pp. 39-43, XP002466253.
Odinaev et al, "Cliques in Neural Ensembles as Perception Carriers", Technion—Institute of Technology, 2006 International Joint Conference on neural Networks, Canada, 2006, pp. 285-292.
Ortiz-Boyer et al, "CIXL2: A Crossover Operator for Evolutionary Algorithms Based on Population Features", Journal of Artificial Intelligence Research 24 (2005) Submitted 11 /04; published Jul. 2005, pp. 1-48.
Queluz, "Content-Based Integrity Protection of Digital Images", SPIE Conf. on Security and Watermarking of Multimedia Contents, San Jose, Jan. 1999, pp. 85-93.
Rui, Yong et al. "Relevance feedback: a power tool for interactive content-based image retrieval." IEEE Transactions on circuits and systems for video technology 8.5 (1998): 644-655.

(56) References Cited

OTHER PUBLICATIONS

Santos et al., "SCORM-MPEG: an Ontology of Interoperable Metadata for multimediaand E-Learning", 23rd International Conference on Software, Telecommunications and Computer Networks (SoftCom), 2015, pp. 224-228.

Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.

Schneider et al, "A Robust Content based Digital Signature for Image Authentication", Proc. ICIP 1996, Lausane, Switzerland, Oct. 1996, pp. 227-230.

Srihari et al., "Intelligent Indexing and Semantic Retrieval of Multimodal Documents", Kluwer Academic Publishers, May 2000, vol. 2, Issue 2-3, pp. 245-275.

Srihari, Rohini K. "Automatic indexing and content-based retrieval of captioned images" Computer 0 (1995): 49-56.

Stolberg et al, "HIBRID-SOC: A mul ti-core SOC architecture for mul timedia signal processing", 2003 IEEE, pp. 189-194.

Theodoropoulos et al, "Simulating Asynchronous Architectures on Transputer Networks", Proceedings of the Fourth Euromicro Workshop on Parallel and Distributed Processing, 1996. PDP '96, pp. 274-281.

Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.

Wang et al., "Classifying Objectionable Websites Based onImage Content", Stanford University, pp. 1-12.

Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.

Whitby-Strevens, "The transputer", 1985 IEEE, pp. 292-300.

Wilk et al., "The Potential of Social-Aware Multimedia Prefetching on Mobile Devices", International Conference and Workshops on networked Systems (NetSys), 2015, pp. 1-5.

Yanagawa et al, "Columbia University's Baseline Detectors for 374 LSCOM Semantic Visual Concepts", Columbia University ADVENT Technical Report # 222-2006-8, Mar. 20, 2007, pp. 1-17.

Yanagawa et al., "Columbia University's Baseline Detectors for 374 LSCOM Semantic Visual Concepts", Columbia University ADVENT Technical Report #222, 2007, pp. 2006-2008.

Zhou et al, "Ensembling neural networks: Many could be better than all", National Laboratory for Novel Software Technology, Nanjing University, Hankou Road 22, Nanjing 210093, PR China Received Nov. 16, 2001, Available online Mar. 12, 2002, pp. 239-263.

Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.

Zhu et al., "Technology-Assisted Dietary Assesment", Proc SPIE. Mar. 20, 2008, pp. 1-15.

Zou et al., "A Content-Based Image Authentication System with Lossless Data Hiding", ICME 2003, pp. 213-216.

\* cited by examiner

SYSTEM AND METHOD FOR PROVIDING RECOMMENDATIONS BASED ON USER PROFILES

CROSS-REFERENCE TO RELATED APPLICATIONS

This application claims the benefit of U.S. Provisional Application No. 62/292,388 filed on Feb. 8, 2016. This application is also a continuation-in-part of U.S. patent application Ser. No. 14/280,928 filed on May 19, 2014, which claims the benefit of U.S. Provisional Application No. 61/833,028 filed on Jun. 10, 2013. The Ser. No. 14/280,928 application is also a continuation-in-part of U.S. patent application Ser. No. 13/856,201 filed on Apr. 3, 2013, which claims the benefit of U.S. Provisional Application No. 61/766,016 filed on Feb. 18, 2013. The Ser. No. 14/280,928 application is also a continuation-in-part (CIP) of U.S. patent application Ser. No. 13/624,397 filed on Sep. 21, 2012, now U.S. Pat. No. 9,191,626. The Ser. No. 13/624,397 application is a continuation-in-part of:

(a) U.S. patent application Ser. No. 13/344,400 filed on Jan. 5, 2012, now U.S. Pat. No. 8,959,037, which is a continuation of U.S. patent application Ser. No. 12/434,221 filed on May 1, 2009, now U.S. Pat. No. 8,112,376. The Ser. No. 12/434,221 application is a continuation-in-part of the below-referenced U.S. patent applications Ser. Nos. 12/084, 150 and 12/195,863;

(b) U.S. patent application Ser. No. 12/195,863 filed on Aug. 21, 2008, now U.S. Pat. No. 8,326,775, which claims priority under 35 USC 119 from Israeli Application No. 185414, filed on Aug. 21, 2007, and which is also a continuation-in-part of the below-referenced U.S. patent application Ser. No. 12/084,150; and (c) U.S. patent application Ser. No. 12/084,150 having a filing date of Apr. 7, 2009, now U.S. Pat. No. 8,655,801, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006.

All of the applications referenced above are herein incorporated by reference for all that they contain.

TECHNICAL FIELD

The present disclosure relates generally to the analysis of multimedia content, and more specifically to a system and methods for providing recommendations to user based on their interests.

BACKGROUND

With the abundance of data made available through various means in general and the Internet and world-wide web (WWW) in particular, a need to understand likes and dislikes of users has become essential for on-line businesses.

Existing solutions provide several tools to identify users' preferences. Some existing solutions actively require an input from the users to specify their interests. However, profiles generated for users based on their inputs may be inaccurate as the users tend to provide only their current interests, or only otherwise only provide partial information due to privacy concerns.

Other existing solutions passively track the users' activity through particular web sites such as social networks. The disadvantage with such solutions is that typically limited information regarding the users is revealed, as users tend to provide only partial information due to privacy concerns. For example, users creating an account on Facebook® provide in most cases only the mandatory information required for the creation of the account. Additional information about such users may be collected over time, but may take significant amounts of time (i.e., gathered via multiple social media or blog posts over a time period of weeks or months) to be useful for accurate identification of user preferences.

Additionally, some existing solutions for determining user preferences attempt to identify and recommend content that is similar to content enjoyed by the user based on information noted by tags of the content such as, for example, subject matter, the entity that created the content, actors or actresses appearing in the content, and the like. Such solutions also face challenges based on lack of accurate information regarding what content the user has viewed and whether the user enjoyed such content.

It would therefore be advantageous to provide a solution that overcomes the deficiencies of the prior art

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for providing recommendations based on current user interests. The method includes identifying at least one current variable, wherein each current variable is associated with a user device or a user; determining, based on the identified at least one current variable, at least one current user interest of a user profile, the user profile including at least one contextual insight, wherein each contextual insight is based on at least one signature for at least one multimedia content element associated with the user; searching for at least one multimedia content element that matches the at least one current user interest; and causing a display of the at least one matching content item as a recommendation.

Certain embodiments disclosed herein also include a non-transitory computer readable medium having stored thereon instructions for causing a processing system to perform a method for providing recommendations based on current user interests, wherein the instructions cause the processing system to: identify at least one current variable, wherein each current variable is associated with a user device or a user; determine, based on the identified at least one current variable, at least one current user interest of a user profile, the user profile including at least one contextual insight, wherein each contextual insight is based on at least one signature for at least one multimedia content element associated with the user; search for at least one content item that matches the at least one current user interest; and cause a display of the at least one matching content item as a recommendation.

Certain embodiments disclosed herein also include a system for providing recommendations based on user profiles. The system includes a processing system; and a memory, wherein the memory contains instructions that, when executed by the processing system, configure the system to: identify at least one current variable, wherein each current variable is associated with a user device or a user; determine, based on the identified at least one current variable, at least one current user interest of a user profile, the user profile including at least one contextual insight, wherein each contextual insight is based on at least one signature for at least one multimedia content element associated with the user; search for at least one content item that matches the at least one current user interest; and cause a display of the at least one matching content item as a recommendation.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
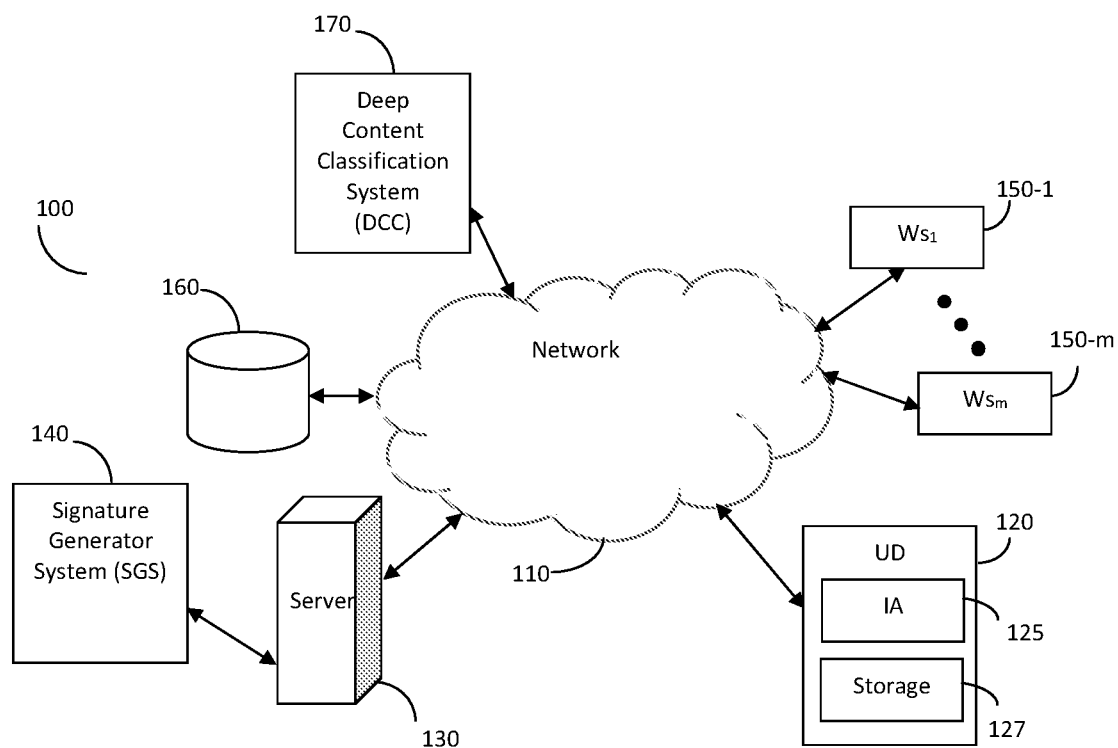
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some disclosed features but not to others. In general, unless otherwise indicated, singular elements may be in plural and vice versa with no loss of generality. In the drawings, like numerals refer to like parts through several views.

The embodiments disclosed herein include a system and method for providing recommendations based on user profiles. Each of the user profiles indicates user interests. Each user interest is an indicator that represents a positive or negative impression of the user with respect to a particular multimedia content element at a specific time frame. Variables associated with the user are received. Based on the received variables, a user profile is queried to determine at least one user interest. Data sources are crawled through to identify multimedia content elements matching the at least one user interest. The multimedia content elements are provided to the user.

FIG. 1 shows an example schematic diagram of a network system 100 utilized to describe the various embodiments disclosed herein. A network 110 is used to communicate between different parts of the system. The network 110 may be the Internet, the world-wide-web (WWW), a local area network (LAN), a wide area network (WAN), a metro area network (MAN), and other networks capable of enabling communication between the elements of the system 100.

Further connected to the network 110 is a user device 120. The user device 120 may be, but is not limited to, a personal computer (PC), a personal digital assistant (PDA), a mobile phone, a smart phone, a tablet computer, an electronic wearable device (e.g., glasses, a watch, etc.), a smart television, or another kind of wired or mobile device equipped with browsing, viewing, capturing, storing, listening, filtering, and managing capabilities enabled as further discussed herein below.

In some embodiments, the user device 120 may have installed therein an interest analyzer 125. The interest analyzer 125 may be a dedicated application, script, or any program code stored in a memory of the user device 120 and is executable, for example, by a processing system (e.g., microprocessor) of the user device 120. The interest analyzer 125 may be configured to perform some or all of the processes performed by a server 130 and disclosed herein. It should be noted that only one user device 120 and one interest analyzer 125 are discussed with reference to FIG. 1 merely for the sake of simplicity. The embodiments disclosed herein are applicable to a plurality of user devices that can access the server 130, and each user device may have multiple applications installed thereon.

In another embodiment, the user device 120 may include a local storage 127. The local storage 127 may include multimedia content captured or received by the user device 120. For example, the local storage 127 may include photographs and videos either captured via a camera (not shown) of the user device 120 or downloaded from a website (e.g., via the network 110).

Also communicatively connected to the network 110 is a data warehouse 160 that stores multimedia content elements associated with a user of the user device 120. According to an embodiment, the data warehouse 160 may be associated with a social network the user belongs to. According to another embodiment, the data warehouse 160 may be a cloud-based storage accessible by the user device 120. In the embodiment illustrated in FIG. 1, a server 130 communicatively communicates with the data warehouse 160 through the network 110. Such communication may be subject to an approval received from the user device 120.

The system 100 shown in FIG. 1 includes a signature generator system (SGS) 140 and a deep-content classification (DCC) system 170 which may be utilized by the server 130 to perform the various disclosed embodiments. Each of the SGS 140 and the DCC system 170 may be connected to the server 130 directly or through the network 110. In certain configurations, the SGS 140, the DCC system 170, or both may be embedded in the server 130. It should be noted that the server 130 typically comprises a processing system (not shown) such as a processor and a memory (not shown). The processing system is coupled to the memory, which is configured to contain instructions that can be executed by the processing system. The server 130 also includes a network interface (not shown) to the network 110. In one embodiment, the server 130 is communicatively connected to or includes an array of computational cores (not shown) configured as discussed in more detail herein below.

A plurality of web sources 150-1 through 150-*m* (hereinafter referred to individually as a web source 150 and collectively as web sources 150, merely for simplicity purposes) are further communicatively connected to the network 110 and accessible by the server 130. The web sources 150 may include, but are not limited to, a search engine, a content provider server, a vertical comparison engine, a content publisher server, a mobile application installed on the user device, a social network, a content website, a combination thereof, and the like. The web sources 150 include multimedia content elements utilized for generating contextual insights. Alternatively or collectively, the multimedia content elements utilized for generating contextual insights may be stored in the local storage 127 of the user device 120, a storage of the server 130, or both.

According to an embodiment, upon receiving at least one variable captured or otherwise provided via the user device 120, the server 130 is configured to analyze the variable. The variables may include personal variables associated with the user, environmental variables associated with the user device 120, or both. The environmental variables may include, for example, a search history, a time of day, a list of social friends as posted on a social web site, location information, motion information, weather information, and so on. The personal variables may include any type of demographic information related to the user.

Based on the variables, the server 120 is configured to query a user profile stored in the data warehouse 160 to determine at least one current user interest. As a non-limiting example, environmental variables may indicate that the user device 120 is currently located in Manhattan and that it is currently morning. The user profile indicates that the user interacts with financial content on a daily basis. Thus, the current user interest may be determined to be "Wall Street articles" or "finance articles published in New York."

According to another embodiment, at least one data storage unit associated with the user of the user device 120 is crawled through to identify, based on the current user interest, multimedia content elements that are potentially interesting to the user. In an embodiment, the crawling may be based on a textual representation of the user interest.

A multimedia content element may be or may include, but is not limited to, an image, a graphic, a video stream, a video clip, an audio stream, an audio clip, a video frame, a photograph, and an image of signals (e.g., spectrograms, phasograms, scalograms, etc.), a combination thereof, or a portion thereof. The at least one storage unit may include any of the web sources 150, the local storage 127 of the user device 120, or a combination thereof.

In an embodiment, the server 130 sends each potentially interesting multimedia content element identified to the SGS 140, the DCC system 170, or both. The decision as to whether the potentially interesting multimedia content elements are sent to the SGS 140 or to the DCC system 170 (or to both) may be predetermined or may be based on the request. In a further embodiment, the SGS 140 receives the potentially interesting multimedia content elements and returns at least one signature for each potentially interesting multimedia content element. The generated signatures may be robust to noise and distortion. The process for generating the signatures is discussed in detail herein below. In an alternative embodiment, the server 130 or the DCC system 170 may generate the signatures for the potential multimedia content elements.

Based on the generated signatures, the server 130 is configured to search for similar multimedia content elements in a data source such as, but not limited to, the data warehouse 160, the local storage 127, a storage of the server 130, a combination thereof, and the like. In an embodiment, searching for similar multimedia contents may include matching between the generated signatures and signatures representing the multimedia content elements in the data source. The matching may be based on similarities between signatures. An example process of matching between multimedia content elements is discussed in detail below with respect to FIGS. 4 and 5.

The server 130 is configured to analyze the potentially interesting multimedia content elements based on the generated signatures to determine whether the potentially interesting multimedia content elements match the current user interest. In an embodiment, the analysis may include identifying the source in which each multimedia content element was identified. The determination of whether the potentially interesting multimedia contents match the current user interest may further be based on the identified sources. For example, a website accessed by the user device 120 on a daily basis is more likely to include content that matches the user's current interests than generic content retrieved from a search engine.

According to another embodiment, metadata associated with each potentially interesting multimedia content element may by identified by the server 130. The metadata may include, for example, a time pointer associated with the capture of each multimedia content element, a time pointer associated with the upload of each multimedia content element, a location pointer associated the capture of each multimedia content element, a location pointer associated with the upload of each multimedia content element, one or more tags added to each multimedia content element, a combination thereof, and the like.

In a further embodiment, such metadata may be analyzed, and the results of the metadata analysis may be utilized to, e.g., determine whether the multimedia content element is of interest to the user. For example, if a user interest is "Tennis," a multimedia content element associated with a location pointer indicating the geographic location of a tennis court may be of interest to the user.

According to another embodiment, the analysis of the potentially interesting multimedia content element may further be based on one or more concept structures (hereinafter referred to as "concepts"). A concept is a collection of signatures representing elements of the unstructured data and metadata describing the concept. As a non-limiting example, a 'Superman concept' is a signature-reduced cluster of signatures describing elements (such as multimedia elements) related to, e.g., a Superman cartoon: a set of metadata representing proving textual representation of the Superman concept. Techniques for generating concept structures are also described in U.S. Pat. No. 8,266,185 to Raichelgauz et al., which is assigned to the common assignee, and is incorporated hereby by reference for all that it contains.

In a further embodiment, a query is sent to the DCC system 170 to match an identified potentially interesting multimedia content element to at least one concept. The identification of a concept matching the identified multimedia content element includes matching at least one signature generated for the potentially interesting multimedia content element (which may be generated either by the SGS 140 or the DCC system 170) and comparing the generated potentially interesting multimedia content element signatures to signatures representing each concept. The matching can be performed across all concepts maintained by the system DCC 160.

Based on the analysis, the server 130 is configured to determine one or more recommended multimedia content elements that match the user's interest and to provide recommendations based on the recommended multimedia content elements to the user device 120. The recommendations may include, but are not limited to, the recommended multimedia content elements, a link to a data source providing the recommended multimedia content elements, bibliographic or otherwise identifying information of the recommended multimedia content elements, downloads of the multimedia content elements, application redirects to web sites featuring the recommended multimedia content elements, in-application suggestions of the recommended multimedia content elements, and the like.

Figure 2:
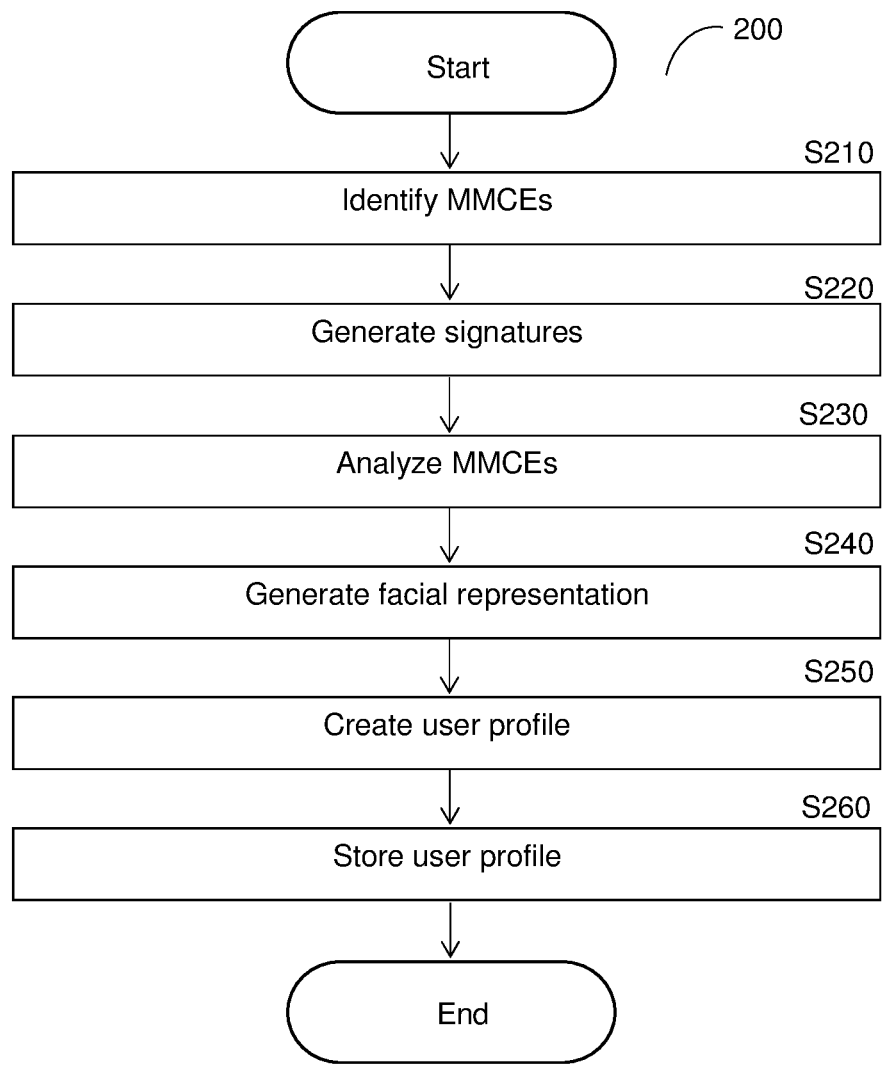
FIG. 2 is a flowchart illustrating a method for generating a user profile based on a plurality of multimedia content elements associated with a user of a user device according to an embodiment.

FIG. 2 depicts an example flowchart 200 illustrating a method for generating a user profile based on an analysis of multimedia content elements according to an embodiment. In an embodiment, the method may be performed by a server (e.g., the server 130). In another embodiment, the method may be performed by an interest analyzer (e.g., the interest analyzer 125 installed on the user device 120).

At S210, multimedia content elements are identified through one or more data sources associated with a user of a user device. The multimedia content elements may be identified based on a request for creating a user profile. The request may indicate, for example, particular multimedia content elements to be identified, data sources in which the multimedia content elements may be identified, metadata tags of multimedia content elements to be identified, combinations thereof, and the like.

In a further embodiment, S210 may include pre-filtering multimedia content elements that are unrelated to the user's face or to faces generally. To this end, S210 may further include analyzing metadata tags associated with multimedia content elements in the one or more data sources to identify multimedia content elements featuring the user's face. As a non-limiting example, if tags associated with a multimedia content element indicate that the multimedia content element does not show a person or, in particular, does not show the user, the multimedia content element may be pre-filtered out. The pre-filtering may reduce subsequent usage of computational resources due to, e.g., signature generation, concept correlation, and the like.

At S220, at least one signature is generated for each identified multimedia content element. In an embodiment, S220 may include generating a signature for one or more portions of any or all of the multimedia content elements. Each signature represents a concept associated with the multimedia content element. For example, a signature generated for a multimedia content element featuring a man in a costume may represent at least a "Batman®" concept. The signature(s) are generated by a signature generator (e.g., the SGS 140 or the signature generator 810) as described herein below with respect to FIGS. 4 and 5.

At S230, the identified multimedia content elements are analyzed based on the signatures. In an embodiment, the analysis includes determining a context of the identified multimedia content elements related to the user's face. In a further embodiment, the analysis includes determining, based on the context, multimedia content elements that optimally describe the user's face and generating a cluster including signatures representing the optimally descriptive multimedia content elements. Determining a context of multimedia content is described further herein below with respect to FIG. 3.

At optional S240, based on the analysis, a facial representation of the user of the user device is generated. In an embodiment, generating the facial representation may include filtering out multimedia content elements or portions thereof that are not related to the user's face. In an embodiment, generating the facial representation may include generating a cluster of signatures including signatures associated with multimedia content elements that optimally describe the face of the user. In another embodiment, generating the facial representation may include determining a list of facial features representing the user's face.

At S250, a user profile is generated. The user profile may include the facial representation. The user profile may further include metadata associated with one or more of the identified multimedia content elements, metadata associated with the user, or both. In a further embodiment, creating the user profile may include analyzing a plurality of multimedia content elements associated with the user to determine information related to the user such as, for example, interests of the user, contacts of the user (e.g., friends, family, and acquaintances), events the user has attended, a profession of the user, and the like. An example method and system for creating user profiles based on analysis of multimedia content elements is described further in U.S. patent application Ser. No. 14/280,928, which is assigned to the common assignee, which is hereby incorporated by reference for all that it contains.

At S260, the generated user profile is sent for storage in a storage such as, for example, the data warehouse 160.

Figure 3:
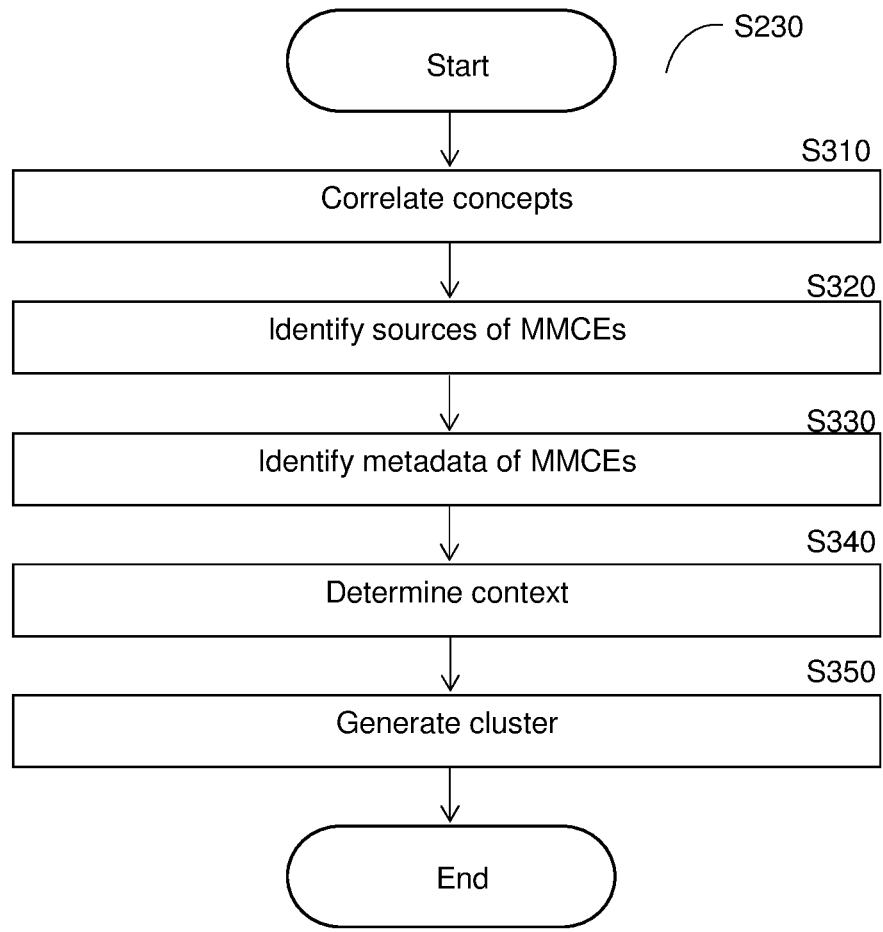
FIG. 3 is a flowchart illustrating a method for analyzing a plurality of multimedia content elements according to an embodiment.

FIG. 3 depicts an example flowchart 300 illustrating a method for analyzing a plurality of multimedia content elements according to an embodiment. In an embodiment, the method is performed using signatures generated for the multimedia content elements.

At S310, a DCC system is queried with the generated signatures to identify at least one concept structure matching the multimedia content elements. The metadata of the matching concept structure is used for correlation between a first multimedia content element and at least a second multimedia content element of the plurality of multimedia content elements.

At optional S320, a source of each multimedia content element is identified. As further described hereinabove, the source of each multimedia content element may be indicative of the content and/or the context of the multimedia content element. In an embodiment, S320 may further include determining, based on the source of each multimedia content element, at least one potential context of the multimedia content element. In a further embodiment, each source may be associated with a plurality of potential contexts of multimedia content elements. As a non-limiting example, for a multimedia content stored in a source including video clips of basketball games, potential contexts may include, but are not limited to, "basketball," "the Chicago Bulls®," "the Golden State Warriors®," "the Cleveland Cavaliers®," "NBA," "WNBA," "March Madness," and the like.

At optional S330, metadata associated with each multimedia content element is identified. The metadata may include, for example, a time pointer associated with a capture of each multimedia content element or with an upload of each multimedia content element, a location pointer associated with a capture of each multimedia content element or with an upload of each multimedia content element, one or more tags added to each multimedia content element, a combination thereof, and so on.

At S340, a context of the multimedia content elements is determined. In an embodiment, the context may be determined based on the correlation between a plurality of concepts related to multimedia content elements. The context may be further based on relationships between the multimedia content elements.

At S350, based on the determined context, a cluster including signatures related to multimedia content elements that optimally describe the user's face is generated. In an embodiment, S350 includes matching the generated signatures to a signature representing the determined context. Signatures matching the context signature above a predefined threshold may be determined to represent multimedia content elements that optimally describe the user's face. In a further embodiment, the cluster may be a signature reduced cluster.

Figure 4:
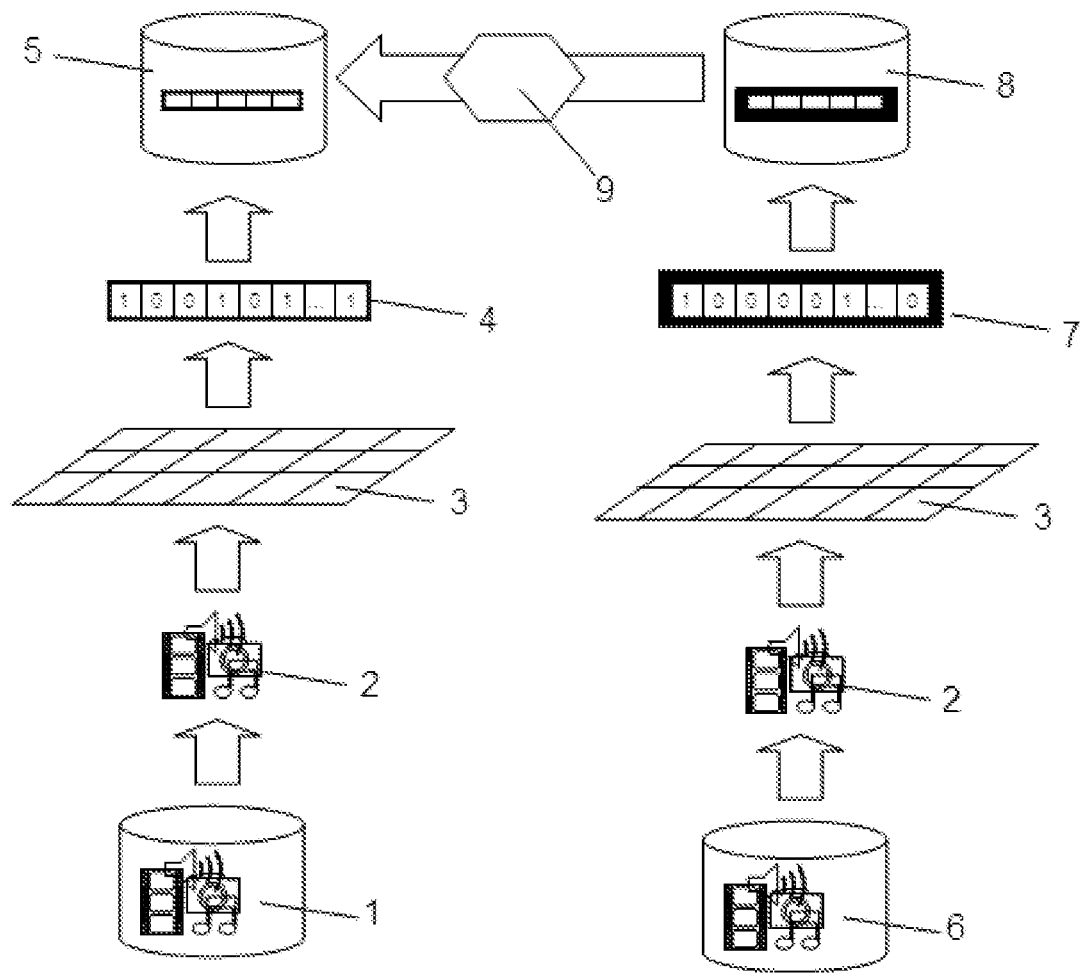
FIG. 4 is a block diagram depicting the basic flow of information in the signature generator system.
Figure 5:
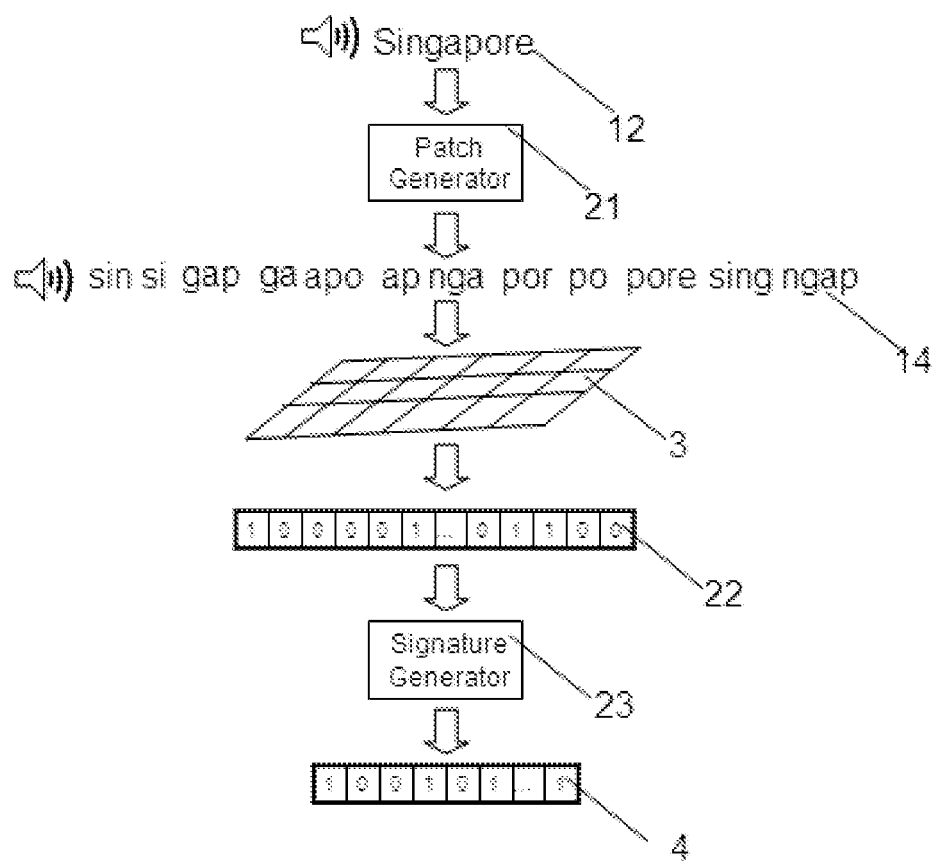
FIG. 5 is a diagram showing the flow of patches generation, response vector generation, and signature generation in a large-scale speech-to-text system.

FIGS. 4 and 5 illustrate the generation of signatures for the multimedia content elements by the SGS 140 according to one embodiment. An example high-level description of the process for large scale matching is depicted in FIG. 4. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An example process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

To demonstrate an example of the signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames. In an embodiment the server 130 is configured with a plurality of computational cores to perform matching between signatures.

The Signatures' generation process is now described with reference to FIG. 5. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame 'i' is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $Ci=\{n_i\}$ ($1 \leq i \leq L$) may consist of a single leaky integrate-to-threshold unit (LTU) node or more nodes. The node $n_i$ equations are:

$$V_i = \sum_j w_{ij} k_j$$

$$n_i = \theta(V_i - Th_x)$$

where, $\theta$ is a Heaviside step function; $w_{ij}$ is a coupling node unit (CNU) between node i and image component j (for example, grayscale value of a certain pixel j); kj is an image component 'j' (for example, grayscale value of a certain pixel j); Thx is a constant Threshold value, where 'x' is 'S' for Signature and 'RS' for Robust Signature; and Vi is a Coupling Node Value.

The Threshold values Thx are set differently for Signature generation and for Robust Signature generation. For example, for a certain distribution of Vi values (for the set of nodes), the thresholds for Signature ($Th_S$) and Robust Signature ($Th_{RS}$) are set apart, after optimization, according to at least one or more of the following criteria:
For:

$$V_i > Th_{RS} 1 - p(V > Th_s) - 1 - (1 - \varepsilon)^l << 1 \qquad 2:$$

i.e., given that l nodes (cores) constitute a Robust Signature of a certain image I, the probability that not all of these l nodes will belong to the Signature of same, but noisy image, $\tilde{I}$ is sufficiently low (according to a system's specified accuracy).

$$p(V_i > Th_{RS}) \approx l/L \qquad 2:$$

i.e., approximately l out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found in U.S. Pat. Nos. 8,326,775 and 8,312,031, assigned to the common assignee, which are hereby incorporated by reference for all the useful information they contain.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

A detailed description of the Computational Core generation and the process for configuring such cores is discussed in more detail in the above-referenced U.S. patent application Ser. No. 12/084,150.

Figure 6:
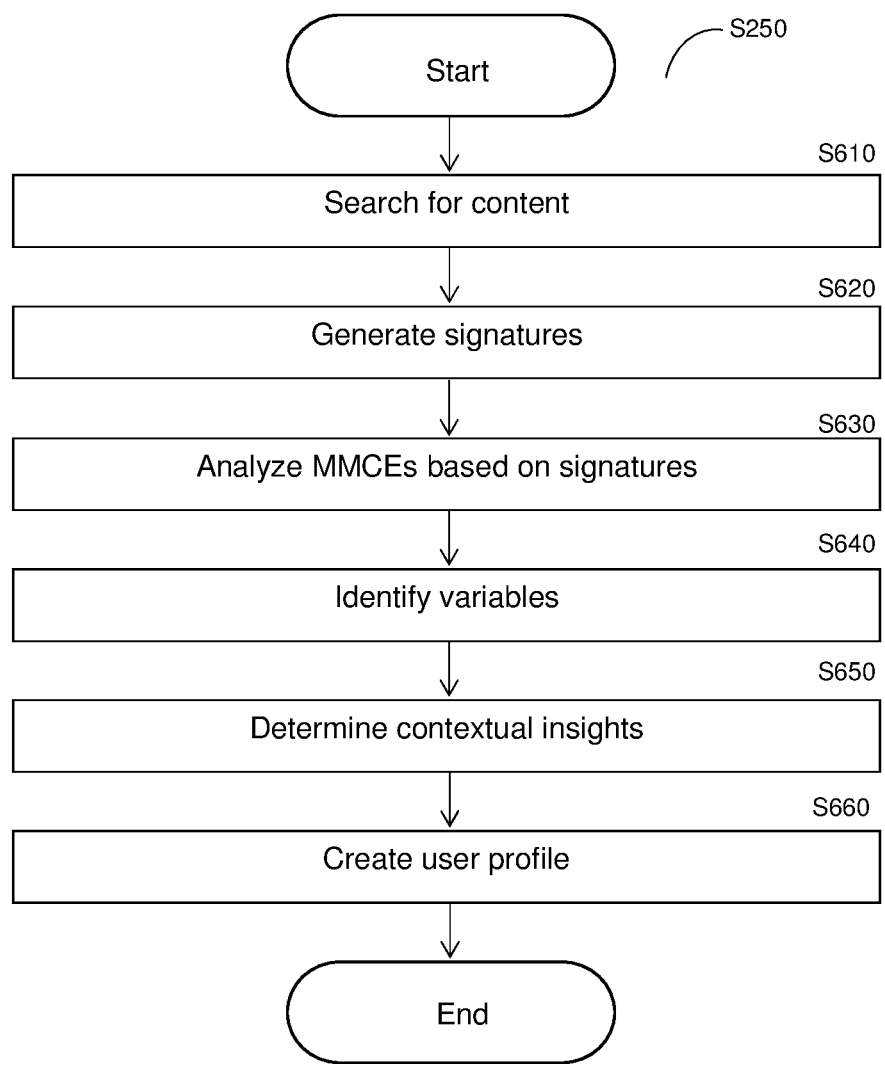
FIG. 6 is a flowchart illustrating a method for creating a user profile according to an embodiment.

FIG. 6 is an example flowchart S250 illustrating a method for creating a user profile based on an analysis of a plurality of multimedia content elements according to an embodiment.

At S610, a plurality of multimedia content elements associated with a user are identified through data sources accessible by a user device. The plurality of multimedia content elements may be identified based on, but not limited to, a request for recommendations, a user profile of the user, a combination thereof, and the like. The data sources may include web sources, a local storage of the user device, a local storage of a server, or a combination thereof.

At S620, at least one signature is identified for each identified multimedia content element. The signature(s) may be generated by a signature generator (e.g., the SGS 140) as described hereinabove with respect to FIGS. 4 and 5. It should also be noted that any of the signatures may be generated based on a portion of a multimedia content element.

At S630, the plurality of multimedia content elements is analyzed based on the generated signatures. In an embodiment, the analysis may include determining a context or one or more concepts of the signatures as described further herein above with respect to FIG. 3. In an embodiment, S630 may further include matching the concepts, the context, the signatures, or a combination thereof based on user interests of the user. In a further embodiment, the matching may include matching the concepts, the context, the signatures, or a combination thereof to signatures representing the user interests.

At S640, profile variables for creating the user profile are identified. Each of the profile variables is associated with the user or with the user device. The profile variables may include, but are not limited to, environmental variables, personal variables, and a combination thereof. The environmental variables may include, but are not limited to, at least one of: a search history, a time of day, a list of social friends as posted on a social web site, location information, motion information, weather information, and the like. The personal variables may include demographic information related to the user.

In an embodiment, S640 may further include identifying metadata associated with the user. The metadata may include, for example, a time pointer associated with the capture or upload of each multimedia content element, a location pointer associated with the capture or upload of each multimedia content element, one or more tags added to each multimedia content element, a combination thereof, and the like. In a further embodiment, S640 may include analyzing the identified metadata associated with the user to determine one or more variables associated with the user.

In S650, at least one contextual insight is generated based on the analysis of the identified multimedia content elements. The contextual insights are conclusions related to a preference of the user. For example, if a user interest is "motorcycles" and a concept related to multimedia content elements viewed by the user is "red vehicles," a contextual insight may be a user preference for "red motorcycles." As another example, if a user interest is "shopping" and a concept related to multimedia content elements viewed by the user is "located in Las Vegas, Nev.," a contextual insight may be a preference for shopping outlets in Las Vegas, Nev.

At S660, a user profile is created based on the contextual insights. In an embodiment, the user profile includes associations between each contextual insight and at least one of the identified variables. The associations between contextual insights and variables may be utilized to determine, for example, current user interests based on recent identification of particular variables. In an embodiment, the generated user profile may be sent for storage in, for example, a storage (e.g., the data warehouse 160).

Figure 7:
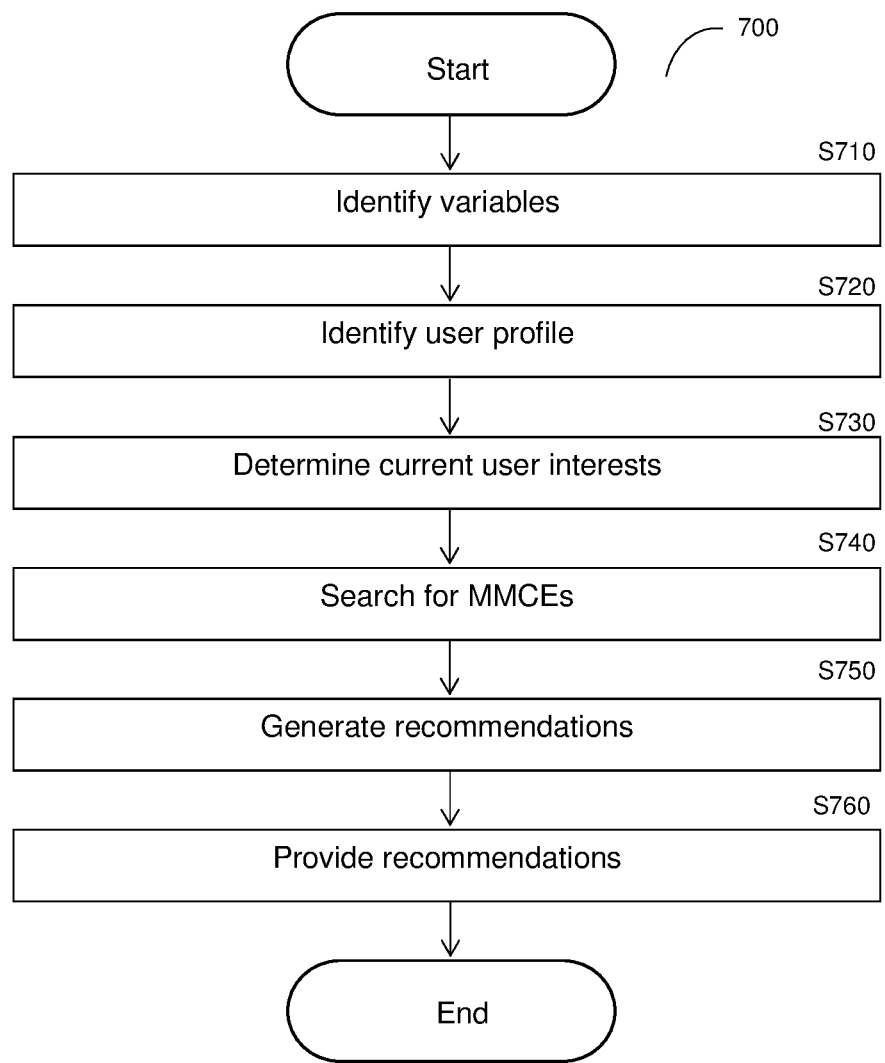
FIG. 7 is a flowchart illustrating a method for providing recommendations to a user based on a user profile according to an embodiment.

FIG. 7 is an example flowchart 700 illustrating a method for providing one or more multimedia content items as recommendations based on a user profile according to an embodiment. In an embodiment, the method may be performed by a server (e.g., the server 130). In another embodiment, the method may be performed by an interest analyzer (e.g., the interest analyzer 125 of the user device 120).

In various embodiments, the method may begin in response to receipt of a request for recommended content. The request may include an identifier of a user profile such as, but not limited to, a user name, a password, a voice sample, a fingerprint sample, a visual sample (e.g., a captured image of a user's face), an identification number, a QR code, a link to a source including the user profile, combinations thereof, and any other identifiers of user profiles.

At S710, at least one variable is identified. Each variable may be an environmental variable or a personal variable. The environmental variables may include, for example, a search history, a time of day, a list of social friends as posted on a social web site, location information, motion information, weather information, and so on. The personal variables may include any type of demographic information related to the user.

At S720, a user profile is identified. The user profile may be, e.g., a user profile associated with a user of a user device. The user profile may be created as described further herein above with respect to FIG. 6.

At S730, the identified user profile is analyzed to determine at least one current user interest. The current user interests are determined based on an analysis of the user profile with respect to the identified at least one variable. In an embodiment, the current user interests are determined based on contextual insights of the user profile. In a further embodiment, each contextual insight of the user profile may be associated with one or more variables. In a further embodiment, each user interest may be further associated with one or more combinations of variables. In such an embodiment, determining the current user interests may include matching the identified variables to variables associated with user interests of the user profile and determining, based on the matching, corresponding user interests that are currently relevant.

At S740, multimedia content items that match the current user interests are searched for. In an embodiment, S740 may include crawling through a plurality of data sources based on the at least one current user interest. In an embodiment, the crawling may be based on a textual representation of each current user interest.

At S750, upon identifying at least one matching content item, the matching content items are provided as recommendations to a user device. Providing the matching content items as recommendations may include, but is not limited to, providing one or more links to each content item, providing identifying information about each content item, sending the content items to the user device, notifying the user of content items existing on the user device, combinations thereof, and so on.

At S760, it is checked whether additional variables are received and, if so, execution continues with S720; otherwise, execution terminates.

As a non-limiting example, variables including a time of 7:00 PM and a location associated with a gym of a user are identified for a user device at a current time. A user profile of the user is identified. The user profile indicates that the user has a gym membership for the gym and enjoys rock music. Further, the user profile associates user interest in rock music multimedia content elements when the user is at the gym between the times of 7:00 PM to 8:00 PM. The user interest is based on contextual insights generated based on positive user impressions of particular rock songs. Accordingly, the current user interest is identified as "listen to rock music." A local storage of the user device is crawled to find rock music multimedia content elements that may be of interest to the user. The rock music multimedia content elements are provided as recommendations for playing by the user.

It should be noted that the foregoing example is described with respect to searching a local storage of the user device to find rock music to recommend merely for example purposes and without limitation on the disclosed embodiments. As another example, web sources including music streaming websites may be crawled for rock music, and links to or downloads of the rock music found by crawling may be provided as recommendations.

Figure 8:
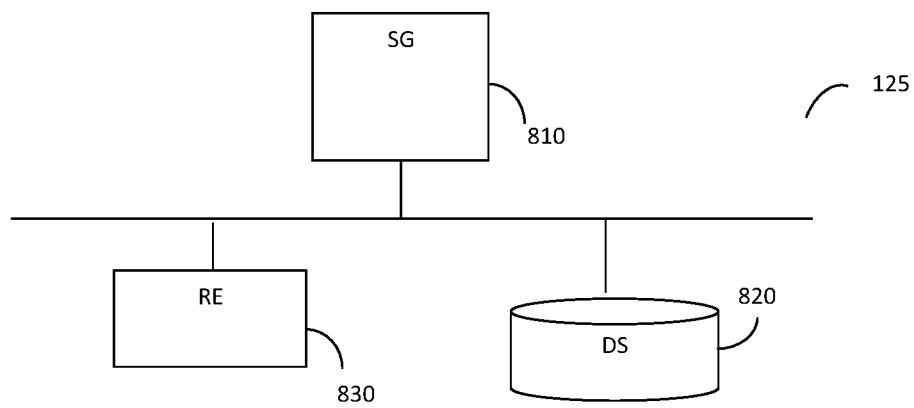
FIG. 8 is a block diagram of an interest analyzer according to an embodiment.

FIG. 8 depicts an example block diagram of an interest analyzer 125 installed on the user device 120 according to an embodiment. The interest analyzer 125 may be configured to access an interface a user device or a server. The interest analyzer 125 is further communicatively connected to a processing system (e.g., a processing system of the user device 120 or of the server 130, not shown) such as a processor and to a memory (e.g., a memory of the user device 120 or of the server 130, not shown). The memory contains therein instructions that, when executed by the processing system, configures the interest analyzer 125 as further described hereinabove and below. The interest analyzer 125 may further be communicatively connected to a storage unit (e.g., the local storage 127 of the user device 120 or a local storage of the server 130, not shown) including a plurality of multimedia content elements.

In an embodiment, the interest analyzer 125 includes a signature generator (SG) 810, a data storage (DS) 820, and a recommendations engine 830. The signature generator 810 may be configured to generate signatures for multimedia content elements. In a further embodiment, the signature generator 810 includes a plurality of computational cores as discussed further herein above, where each computational core is at least partially statistically independent of the other computations cores.

The data storage 820 may store a plurality of multimedia content elements, a plurality of concepts, signatures for the multimedia content elements, signatures for the concepts, or a combination thereof. In a further embodiment, the data storage 820 may include a limited set of concepts relative to a larger set of known concepts. Such a limited set of concepts may be utilized when, for example, the data storage 820 is included in a device having a relatively low storage capacity such as, e.g., a smartphone or other mobile device, or otherwise when lower memory use is desirable.

The recommendations engine 830 may be configured to identify contextual insights based on user profiles, to determine current user interests based on the contextual insights, to query sources of information (including, e.g., the data storage 820 or another data source), and to cause a display of recommendations on the user device 120.

According to an embodiment, the interest analyzer 125 is configured to receive at least one multimedia content element. The interest analyzer 125 is configured to initialize a signatures generator (SG) 810 to generate at least one signature for the received at least one multimedia content element. The memory further contains instructions to query a user profile of the user stored in a data storage (DS) 820 to determine a user interest. The memory further contains instructions to generate a contextual insight based on the user interest and the at least one signature. Based on the contextual insight, a recommendations engine 830 is initialized to search for one or more content items that match the contextual insight. The matching content items may be provided by the recommendations engine 830 to the user as recommendations via the interface.

Each of the recommendations engine 830 and the signature generator 810 can be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

In certain implementations, the recommendation engine 830, the signature generator 810, or both can be implemented using an array of computational cores having properties that are at least partly statistically independent from other cores of the plurality of computational cores. The computational cores are further discussed below.

According to another implementation, the processes performed by the recommendation engine 830, the signature generator 810, or both can be executed by a processing system of the user device 120 or of the server 130. Such processing system may include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

It should be noted that, although FIG. 8 is described with respect to an interest analyzer 125 included in the user device 120, any or all of the components of the interest analyzer 125 may be included in another system or systems (e.g., the server 130, the signature generator system 140, or both) and utilized to perform some or all of the tasks described herein without departing from the scope of the disclosure. As an example, the interest analyzer 125 operable in the user device 120 may send multimedia content elements to the signature generator system 140 and may receive corresponding signatures therefrom. As another example, the user device 120 may send signatures to the server 130 and may receive corresponding recommendations or concepts therefrom. As yet another example, the interest analyzer 125 may be included in the server 130 and may provide recommendations to the user device 120 based on multimedia content elements identified by or received from the user device 120.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the disclosed embodiments and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for providing recommendations based on current user interests, comprising:
   identifying at least one current variable, wherein each current variable is associated with a user device or a user;
   determining, based on the identified at least one current variable, at least one current user interest of a user profile, the user profile including at least one contextual insight, wherein each contextual insight is based on at least one signature for at least one multimedia content element associated with the user; wherein each signature of the at least one signature for at least one multimedia content element associated with the user is generated by a signature generator system, wherein the signature generator system includes a plurality of computational cores configured to receive a plurality of unstructured data elements, each computational core of the plurality of computational cores having properties that are at least partly statistically independent of other of the computational cores, the properties are set independently of each other core;
   searching for at least one content item that matches the at least one current user interest; and
   causing a display of the at least one matching content item as a recommendation.

2. The method of claim 1, further comprising:
   generating the at least one signature the at least one multimedia content element, wherein each of the generated signatures represents a concept; and
   creating a user profile based on the at least one generated signature.

3. The method of claim 2, further comprising:
   determining, based on the generated at least one signature, a concept associated with the at least one multimedia content element, wherein the at least one contextual insight is generated further based on the determined concept.

4. The method of claim 3, wherein the concept is a collection of signatures representing at least one conceptually related multimedia content element and metadata describing the concept, wherein the collection of signatures is a signature reduced cluster generated by inter-matching signatures generated for the at least one multimedia content element.

5. The method of claim 3, further comprising: determining at least one profile variable associated with the user device or the user, wherein the created user profile indicates associations between the at least one profile variable and the at least one contextual insight.

6. The method of claim 5, further comprising: identifying metadata associated with each multimedia content element identified; and
   analyzing the identified metadata, wherein the at least one profile variable is determined based on the identified metadata.

7. The method of claim 6, wherein the identified metadata includes at least one of: a time pointer associated with a capture of each multimedia content element, a time pointer associated with an upload of each multimedia content element, a location pointer associated with the capture of each multimedia content element, a location pointer associated with the upload of each multimedia content element, and at least one tag associated with each multimedia content element.

8. The method of claim 1, wherein the at least one multimedia content element is at least one of: an image, graphics, a video stream, a video clip, an audio stream, an audio clip, a video frame, a photograph, and images of signals.

9. The method of claim 1, wherein the variable is at least one of: a personal variable indicating demographic information related to the user, and an environmental variable associated with the user device.

10. The method of claim 1, wherein each of the at least one signature is robust to noise and distortions.

11. A non-transitory computer readable medium having stored thereon instructions for causing a processing system to perform a method for providing recommendations based on current user interests, wherein the instructions cause the processing system to:
    identify at least one current variable, wherein each current variable is associated with a user device or a user;
    determine, based on the identified at least one current variable, at least one current user interest of a user profile, the user profile including at least one contextual insight, wherein each contextual insight is based on at least one signature for at least one multimedia content element associated with the user; wherein each signature of the at least one signature for at least one multimedia content element associated with the user is generated by a signature generator system, wherein the signature generator system includes a plurality of computational cores configured to receive a plurality of unstructured data elements, each computational core of the plurality of computational cores having properties that are at least partly statistically independent of other of the computational cores, the properties are set independently of each other core;

search for at least one multimedia content element that matches the at least one current user interest; and cause a display of the at least one matching content item as a recommendation.

12. A system for providing recommendations based on current user interests, comprising:

a processing system; and a memory, wherein the memory contains instructions that, when executed by the processing system, configure the system to:

identify at least one current variable, wherein each current variable is associated with a user device or a user;

determine, based on the identified at least one current variable, at least one current user interest of a user profile, the user profile including at least one contextual insight, wherein each contextual insight is based on at least one signature for at least one multimedia content element associated with the user;

search for at least one multimedia content element that matches the at least one current user interest; and cause a display of the at least one matching content item as a recommendation;

wherein the system further comprises a signature generator system, wherein each signature of the at least one signature for at least one multimedia content element associated with the user is generated by the signature generator system, wherein the signature generator system includes a plurality of computational cores configured to receive a plurality of unstructured data elements, each computational core of the plurality of computational cores having properties that are at least partly statistically independent of other of the computational cores, the properties are set independently of each other core.

13. The system of claim 12, wherein the system is further configured to:

generate the at least one signature the at least one multimedia content element, wherein each of the generated signatures represents a concept; and create a user profile based on the at least one generated signature.

14. The system of claim 13, wherein the system is further configured to:

determine, based on the generated at least one signature, a concept associated with the at least one multimedia content element, wherein the at least one contextual insight is generated further based on the determined concept.

15. The system of claim 14, wherein the concept is a collection of signatures representing at least one conceptually related multimedia content element and metadata describing the concept, wherein the collection of signatures is a signature reduced cluster generated by inter-matching signatures generated for the at least one multimedia content element.

16. The system of claim 13, wherein the system is further configured to:

determine at least one profile variable associated with the user device or the user, wherein the created user profile indicates associations between the at least one profile variable and the at least one contextual insight.

17. The system of claim 16, wherein the system is further configured to:

identify metadata associated with each multimedia content element identified; and analyze the identified metadata, wherein the at least one profile variable is determined based on the identified metadata.

18. The system of claim 17, wherein the identified metadata includes at least one of: a time pointer associated with a capture of each multimedia content element, a time pointer associated with an upload of each multimedia content element, a location pointer associated with the capture of each multimedia content element, a location pointer associated with the upload of each multimedia content element, and at least one tag associated with each multimedia content element.

19. The system of claim 12, wherein the at least one multimedia content element is at least one of: an image, graphics, a video stream, a video clip, an audio stream, an audio clip, a video frame, a photograph, and images of signals.

20. The system of claim 12, wherein each variable is: a personal variable indicating demographic information related to the user, and an environmental variable associated with the user device.

21. The system of claim 12, wherein the at least one signature for the at least one multimedia content element is robust to noise and distortions.

* * * * *